(12) United States Patent
Wang

(10) Patent No.: US 11,053,996 B2
(45) Date of Patent: Jul. 6, 2021

(54) HUB MOTOR

(71) Applicant: Qiguang Wang, Guangdong (CN)

(72) Inventor: Qiguang Wang, Guangdong (CN)

( * ) Notice: Subject to any disclaimer, the term of this patent is extended or adjusted under 35 U.S.C. 154(b) by 296 days.

(21) Appl. No.: 16/092,285

(22) PCT Filed: Jun. 20, 2017

(86) PCT No.: PCT/CN2017/089118
§ 371 (c)(1),
(2) Date: Oct. 9, 2018

(87) PCT Pub. No.: WO2018/010524
PCT Pub. Date: Jan. 18, 2018

(65) Prior Publication Data
US 2020/0056669 A1    Feb. 20, 2020

(30) Foreign Application Priority Data

Jul. 15, 2016  (CN) .......................... 201610561312.9
Jul. 15, 2016  (CN) .......................... 201610561314.8
(Continued)

(51) Int. Cl.
*F16D 65/12* (2006.01)
*B60T 1/06* (2006.01)
(Continued)

(52) U.S. Cl.
CPC ............ *F16D 65/127* (2013.01); *B60T 1/062* (2013.01); *F16D 63/002* (2013.01);
(Continued)

(58) Field of Classification Search
CPC .. F16D 65/127; F16D 65/0973; F16D 65/097; F16D 63/02; F16D 27/01;
(Continued)

(56) References Cited

U.S. PATENT DOCUMENTS 3,750,788 A * 8/1973 Heinemann ........... F16D 65/127
192/107 R
4,557,360 A * 12/1985 Kumatani ............... F16D 27/14
192/30 V
(Continued)

FOREIGN PATENT DOCUMENTS

CN     101249803 A    8/2008
CN     102303591 A    1/2012
(Continued)

OTHER PUBLICATIONS

CN-205768621 English Translation (Year: 2016).*
(Continued)

*Primary Examiner* — Melody M Burch
(74) *Attorney, Agent, or Firm* — Wood Herron & Evans LLP

(57) ABSTRACT

A hub motor is provided with a simplified structure to make an automobile more cost effective. The hub motor includes a center shaft, a brake disc fixedly connected with the center shaft, a coil support sleeved on the center shaft, and a motor controller. The coil support advantageously includes first and second coil supports that include first and second vents, respectively.

20 Claims, 8 Drawing Sheets

(30) Foreign Application Priority Data

| | | |
|---|---|---|
| Jul. 15, 2016 | (CN) | 201610562321.X |
| Jul. 15, 2016 | (CN) | 201620750830.0 |
| Jul. 15, 2016 | (CN) | 201620750872.4 |
| Jul. 15, 2016 | (CN) | 201620752372.4 |

(51) Int. Cl.

| | |
|---|---|
| *H02K 49/04* | (2006.01) |
| *F16D 65/097* | (2006.01) |
| *H02K 21/24* | (2006.01) |
| *H02K 7/18* | (2006.01) |
| *H02K 7/14* | (2006.01) |
| *F16D 63/00* | (2006.01) |
| *F16D 69/00* | (2006.01) |
| *F16D 65/02* | (2006.01) |
| *F16D 121/18* | (2012.01) |
| *F16D 27/01* | (2006.01) |

(52) U.S. Cl.
CPC ....... *F16D 65/097* (2013.01); *F16D 65/0973* (2013.01); *H02K 7/14* (2013.01); *H02K 7/1846* (2013.01); *H02K 21/24* (2013.01); *H02K 49/04* (2013.01); *F16D 27/01* (2013.01); *F16D 65/12* (2013.01); *F16D 2065/1308* (2013.01); *F16D 2065/1328* (2013.01); *F16D 2065/1392* (2013.01); *F16D 2069/004* (2013.01); *F16D 2121/18* (2013.01)

(58) Field of Classification Search
CPC ........... F16D 2121/18; F16D 2069/004; B60T 1/062; H02K 49/04
See application file for complete search history.

(56) References Cited

U.S. PATENT DOCUMENTS

| | | | | |
|---|---|---|---|---|
| 5,851,084 | A | * | 12/1998 | Nishikawa ............ F16D 1/0864 403/344 |
| 6,046,518 | A | * | 4/2000 | Williams ................. H02K 3/28 310/43 |
| 2013/0015020 | A1 | * | 1/2013 | Huppunen ............. H02K 1/146 187/250 |
| 2016/0214580 | A1 | * | 7/2016 | Chelaidite ............ B60T 13/741 |
| 2016/0236658 | A1 | * | 8/2016 | Rozza ....................... B60T 1/10 |
| 2019/0078634 | A1 | * | 3/2019 | Wang .................... H02K 49/04 |
| 2020/0282841 | A1 | * | 9/2020 | McGowan ............ F16D 63/002 |

FOREIGN PATENT DOCUMENTS

| | | | |
|---|---|---|---|
| CN | 103821847 | A | 5/2014 |
| CN | 204741398 | U | 11/2015 |
| CN | 105539042 | A | 5/2016 |
| CN | 106015387 | A | 10/2016 |
| CN | 106143118 | A | 11/2016 |
| CN | 106160325 | A | 11/2016 |
| CN | 205768621 | U | 12/2016 |
| CN | 206221537 | U | 6/2017 |
| CN | 206226198 | U | 6/2017 |
| JP | 9303448 | A * | 11/1997 |
| JP | 2004215431 | A | 7/2004 |
| JP | 2008121870 | A | 5/2008 |
| WO | 2013162415 | A1 | 10/2013 |

OTHER PUBLICATIONS

International Searching Authority, Search Report issued in International Application No. PCT/CN2017/089118 dated Sep. 8, 2017 (6 pages).

* cited by examiner

HUB MOTOR

CROSS-REFERENCE TO RELATED APPLICATIONS

This application is a national phase entry of, and claims priority to, International Application No. PCT/CN2017/089118, filed Jun. 20, 2017 which claims priority to each of: Chinese Patent Application No. 201610561312.9, filed with the Chinese Patent Office on Jul. 15, 2016, and entitled "MOTOR AND BRAKE DISC THEREOF"; Chinese Patent Application No. 201610562321.X, filed with the Chinese Patent Office on Jul. 15, 2016, and entitled "HUB MOTOR"; and Chinese Patent Application No. 201610561314.8, filed with the Chinese Patent Office on Jul. 15, 2016, and entitled "AUTOMOBILE HAVING DISC TYPE HUB MOTOR", each of which are incorporated herein by reference in their entirety.

TECHNICAL FIELD

The present invention relates to the technical field of electric automobiles, and in particular, to brake system components of such automobiles.

BACKGROUND

A hub motor technology, which is also known as an in-wheel motor technology, mainly features that a power unit, a transmission device, and a brake device are all integrated into a hub, so that the mechanical part of an electric vehicle is greatly simplified.

A brake disc is a very important component of a brake system. The existing brake disc must cooperate with a brake caliper to implement braking, that is, braking can be implemented by mechanical components only, and the braking mode is single.

The existing hub motor has a complicated structure, requires separate design of the hub, and has a complicated mechanical connection structure. It is necessary to change the disc brake structure of the original vehicle. Due to the complicated structure and large weight of the integral components of the existing hub motor, the rotational inertia of the hub is increased, which affects the handling stability of the vehicle.

Therefore, how to provide a brake disc and related system components to increase the braking mode is a technical problem needing to be solved.

SUMMARY

An object of the present invention is to provide a brake disc, which increases the braking mode. The present invention further provides a motor having the brake disc. The present invention provides a hub motor; the structure of the hub motor is simplified, to improve the handling stability of an automobile. The present invention provides an automobile, which has a simple hub motor structure and light weight; the handling stability of the automobile can be improved.

To achieve the above purpose, embodiments of the present invention provide the following technical solutions: A brake disc is provided, including a brake disc body, where an end face of the brake disc body is provided with through holes, and magnets having a magnetization direction parallel to the axis of the brake disc body are provided in the through holes; the brake disc further includes coils opposite to the magnets; and the coils are able to rotate the brake disc body after being charged.

In one aspect, the through holes are plural in number.

In another aspect, all the through holes are evenly arranged along the circumferential direction of the brake disc body.

In a further aspect, the through holes are circular through holes, and the magnets are cylindrical magnets matching the through holes.

In some embodiments, the magnets are permanent magnets.

In yet another aspect, the coils include first coils and second coils distributed at two sides of the brake disc body.

In one aspect, a side surface of the brake disc body is provided with vents.

In accordance with another embodiment of the present invention, a motor is provided, including a brake disc, where the brake disc is the brake disc according to the description above.

In another embodiment of the present invention, a hub motor is provided, including: a center shaft; a brake disc fixedly connected with the center shaft, an end face of the brake disc being provided with through holes, and magnets having a magnetization direction parallel to the axis of the brake disc being provided in the through holes; and a coil support sleeved on the center shaft and capable of rotating with respect to the center shaft, the coil support being provided with coils opposite to the magnets, and the coils being able to rotate the brake disc after being charged.

In one aspect, the coil support includes a first coil support and a second coil support respectively disposed at two sides of the brake disc; the first coil support and the second coil support are both sleeved on the center shaft; the first coil support and the second coil support are both provided with the coils.

In another aspect, the first coil support and the second coil support are both ring-shaped housings; the sides of the ring-shaped housings close to the brake disc are both provided with openings; the coils are provided at the openings of the ring-shaped housings and opposite to the magnets.

In a further aspect, the first coil support and the second coil support are fixedly connected by screws.

In yet another aspect, the circumferential surface of the brake disc is provided with first vents; the first coil support and the second coil support are connected and second vents are formed on the circumferential surfaces thereof; and the central angle between two adjacent second vents is an integral multiple of the central angle between two adjacent first vents.

Moreover, the ring-shaped housings are both provided in some embodiments with receding grooves for mounting brake calipers.

In one aspect, the ring-shaped housings are both provided with 5/6 circular rings, and gaps formed by the ring-shaped housings are the receding grooves.

In a further aspect, the through holes are plural in number, and the magnets have one-to-one correspondence to the through holes.

In another aspect, all the through holes are evenly arranged along the circumferential direction of the brake disc.

In yet another aspect, the through holes are circular through holes, and the magnets are cylindrical permanent magnets matching the through holes.

In another embodiment according to the present invention, an automobile having a disc type hub motor is provided, including: a wheel; a hub motor including: a center shaft, the center shaft being connected with the wheel; a brake disc fixedly connected with the center shaft, an end face of the brake disc being provided with through holes, and magnets having a magnetization direction parallel to the axis of the brake disc being provided in the through holes; and a coil support sleeved on the center shaft and capable of rotating with respect to the center shaft, the coil support being provided with coils opposite to the magnets, and the coils being able to rotate the brake disc after being charged; a steering knuckle with an end face being connected with the coil support; a suspension connected with the other end face of the steering knuckle; a transmission half-shaft connected with the center shaft; and a motor controller configured to control the supply of alternating current to the coils, when the coils are positively charged, the center shaft rotating positively to provide forward movement power for the wheel; when the coils are reversely charged, the center shaft braking or rotating reversely to implement braking or reverse rotation of the wheel; if no current passes through the coils in the rotation process of the brake disc, a power supply being charged to implement braking energy recovery.

In one aspect, the coil support includes a first coil support and a second coil support respectively disposed at two sides of the brake disc; the first coil support and the second coil support are both sleeved on the center shaft; the first coil support and the second coil support are both provided with the coils; the first coil support is close to the wheel, and the second coil support is connected with the steering knuckle.

In another aspect, the first coil support and the second coil support are both ring-shaped housings; the sides of the ring-shaped housings close to the brake disc are both provided with openings; the coils are provided at the openings of the ring-shaped housings and opposite to the magnets.

In a further aspect, the first coil support and the second coil support are fixedly connected by screws.

In yet another aspect, the ring-shaped housings are both provided with receding grooves for mounting brake calipers.

In one aspect, the ring-shaped housings are both provided with 5/6 circular rings, and gaps formed by the ring-shaped housings are the receding grooves.

In some embodiments, the through holes are plural in number, and are evenly arranged along the circumferential direction of the brake disc; the magnets have one-to-one correspondence to the through holes.

In another aspect, the through holes are circular through holes, and the magnets are cylindrical magnets matching the through holes.

In a further aspect, the magnets are permanent magnets.

In yet another aspect, the circumferential surface of the brake disc is provided with first vents; the first coil support and the second coil support are connected and second vents are formed on the circumferential surfaces thereof; and the central angle between two adjacent second vents is an integral multiple of the central angle between two adjacent first vents.

From the above embodiments explaining the technical solution, it can be known that the present invention discloses a brake disc, including a brake disc body and coils; an end face of the brake disc body is provided with through holes, and magnets having a magnetization direction parallel to the axis of the brake disc are provided in the through holes; the coils correspond to the magnets, and the coils are able to rotate the brake disc body after being charged. According to the brake disc in the present application, the coils are able to rotate the brake disc body after being charged, thereby implementing electric braking or providing power, instead of merely relying on a brake caliper for braking. Therefore, the braking mode of the brake disc is increased. From the above technical solution, it can be known that the present invention discloses a hub motor, including a center shaft, a brake disc, and a coil support; the brake disc is fixed on the center shaft; an end face of the brake disc is provided with through holes, and magnets having a magnetization direction parallel to the axis of the brake disc are provided in the through holes; the coil support is provided with coils corresponding to the magnets, and the coils are able to rotate the brake disc after being charged. The hub motor in the present application has a simple structure, can provide power and implement transmission and braking just through a charging process, solves the problem in the prior art of complicated mechanical mechanism of the hub motor, reduces the weight of the hub motor, and improves the handling stability of the automobile.

From the above technical solution, it can be known that the present invention discloses an automobile, including a wheel, a hub motor, a steering knuckle, a suspension, a transmission half-shaft, and a motor controller. The hub motor includes a center shaft, a brake disc, and a coil support, where the center shaft is connected with the wheel and the transmission half-shaft; the brake disc is fixed on the center shaft; an end face of the brake disc is provided with through holes, and magnets having a magnetization direction parallel to the axis of the brake disc are provided in the through holes; the coil support is provided with coils corresponding to the magnets, and the coils are able to rotate the brake disc after being charged; the steering knuckle is connected with the coil support, and the suspension is connected with the steering knuckle; the center shaft is connected with the transmission half-shaft. The motor controller controls the supply of alternating current to the coils; when the coils are positively charged, the center shaft rotates positively to provide forward movement power for the wheel; when the coils are reversely charged, the center shaft brakes or rotates reversely to implement braking or reverse rotation of the wheel; if no current passes through the coils in the rotation process of the brake disc, a power supply is charged to implement braking energy recovery. In the present application, axially arranged permanent magnets are added to the brake disc, and the coils are provided correspondingly, so that the automobile can be powered and braked under the action of a magnetic field. The hub motor in the present application has a simple structure, can provide power and implement transmission and braking just through a charging process, solves the problem in the prior art of complicated mechanical structure of the hub motor, reduces the weight of the hub motor, and improves the handling stability of the automobile.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrates one or more embodiments of the invention and, together with the general description given above and the detailed description given below, explains the one or more embodiments of the invention.

DETAILED DESCRIPTION

Embodiments of the invention are illustrated below with reference to the accompanying drawings. The preferred embodiments described here are used only to describe and explain the present disclosure, but not to limit the present disclosure. An object of the present invention is to provide a brake disc, which increases the braking mode. Another object of the present invention is to provide a motor having the disc brake. Yet another object of the present invention is to provide a hub motor; the structure of the hub motor is simplified, so as to improve the handling stability of an automobile. A further object of the present invention is to provide an automobile; the structure of a hub motor is simplified, so as to improve the handling stability of the automobile.

The following clearly and completely describes the technical solutions in the embodiments of the present invention with reference to the accompanying drawings in the embodiments of the present invention.

Figure 1:
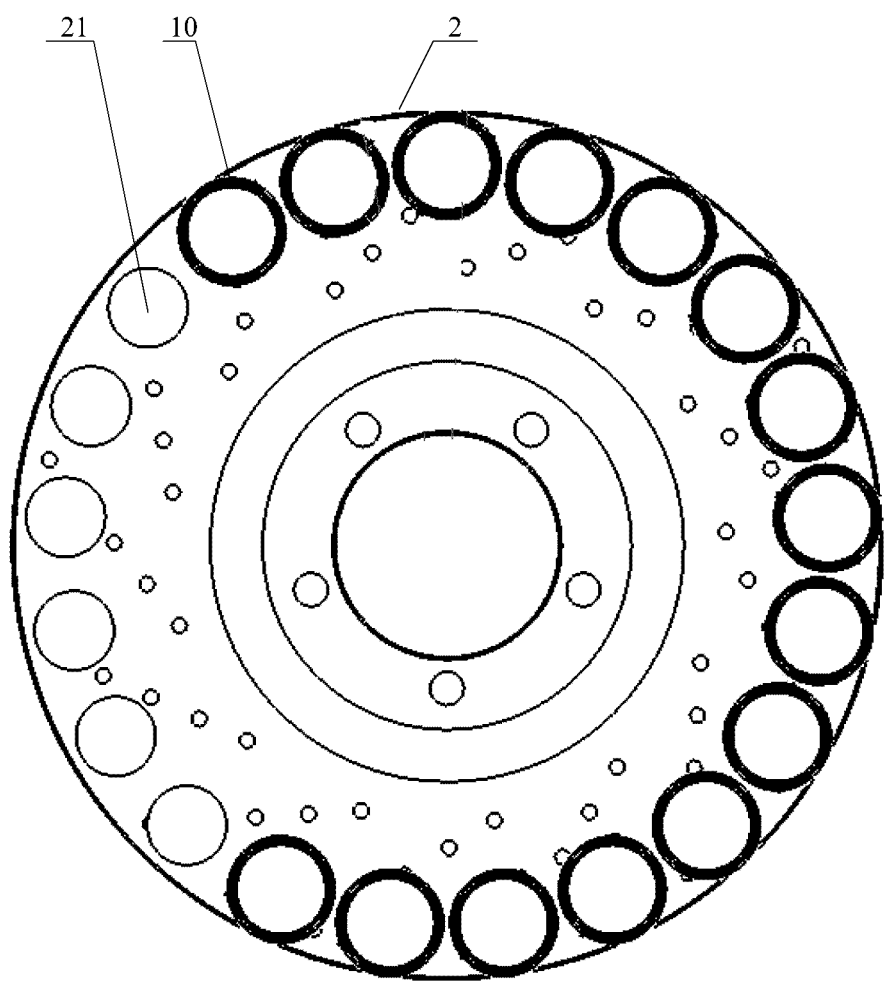
FIG. 1 is a front view of a brake disc provided by one embodiment of the present invention.
Figure 2:
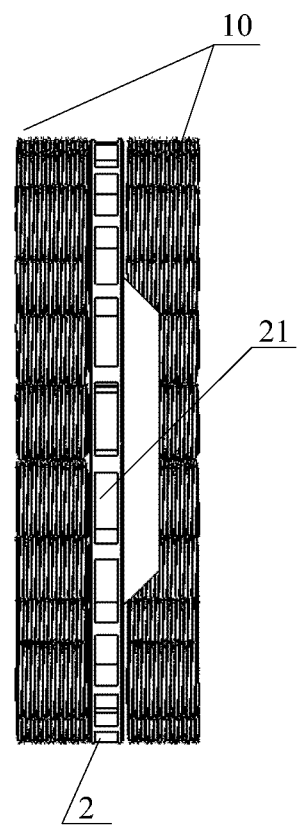
FIG. 2 is a side view of the brake disc of FIG. 1.

As shown in FIGS. 1 and 2, the present invention in one embodiment discloses a brake disc, including a brake disc body 2 and coils 10; an end face of the brake disc body 2 is provided with through holes, and magnets 21 having a magnetization direction parallel to the axis of the brake disc body 2 are provided in the through holes; the coils 10 proportionally correspond to the magnets 21, and the coils 10 are able to rotate the brake disc body 2 after being powered. According to the brake disc in the present application, the coils 10 can rotate the brake disc body 2 after being powered, thereby implementing electromagnetic damping braking or providing power, instead of merely relying on a brake caliper for braking. Therefore, the braking mode of the brake disc is increased.

The through holes provided in the brake disc body 2 disclosed in the present application are plural in number, (for example, 15 or 21) and are evenly arranged along the circumferential direction of the brake disc body 2. The magnets 21 in the present application have one-to-one correspondence to the through holes, i.e., each through hole is provided therein with a magnet 21. After the coils 10 are charged, the magnets 21 on the brake disc body 2 cut the magnetic induction line under the action of magnetic field force, to provide torque to rotate the brake disc body 2.

The through holes disclosed in the embodiment above are circular through holes; the corresponding magnets 21 are cylindrical magnets, and the magnets 21 are permanent magnets. A person skilled in the art can understand that, in practice, the shapes and sizes of the magnets 21 and the through holes, as well as the numbers thereof, can be defined according to different requirements; a person skilled in the art makes no specific limitation here, and those all fall within the scope of protection.

In addition, the coils 10 can further be configured as excitation coils, in order to excite a stronger magnetic field. In practice, the coils 10 may also be ordinary coils.

The coils 10 in the present application include first coils and second coils respectively disposed at two sides of the brake disc 2. The use of two sets of coils 10 can improve the effect of the magnetic field force, thereby improving the power support for the automobile. The number of turns of each coil 10 disclosed in the present application may be 1,000-1,500, and the wire diameter is 0.2-0.8 mm. Here, the ranges of the size and the number of turns of the coils 10 are provided only but can be selected according to different requirements in practice.

A side surface of the brake disc body 2 disclosed in the present application is provided with vents; the cylindrical permanent magnets are equal to the brake disc body 2 in height, and the diameter of the cylindrical permanent magnets is less than the maximum diameter of the vents, thereby ensuring the heat dissipation uniformity and heat dissipation effect of the brake disc body 2.

In addition, the present application further discloses a motor having the brake disc. Therefore, the motor having the brake disc also has all the above technical effects, which are not repeated here.

As shown in FIGS. 3-12, the present invention in another embodiment discloses a hub motor, including a center shaft 5, a brake disc 2, and a coil support; the brake disc 2 is fixed on the center shaft 5; an end face of the brake disc 2 is provided with through holes, and magnets 21 having a magnetization direction parallel to the axis of the brake disc 2 are provided in the through holes; the coil support is provided with coils 10 corresponding to the magnets 21, and the coils 10 are able to rotate the brake disc 2 after being charged. In the present application, axially arranged magnets 21 are added to the brake disc 2, and the coils 10 are provided correspondingly, so that axial driving torque, braking torque and the like can be provided for the brake disc under the action of a magnetic field. The hub motor in the present application has a simple structure, can provide power and implement braking just through a charging process, solves the problem in the prior art of complicated mechanical structure of the hub motor, reduces the weight of the hub motor, and improves the handling stability of the automobile.

A motor controller 20 controls the supply of three-phase or five-phase alternating current to the coils 10 to generate a rotating magnetic field; the axial magnetic field in the coils 10 interacts with the magnetic field of the magnets 21 on the brake disc 2 to generate torque, thereby providing power for driving the automobile. In a braking process of the automobile, no current passes through the coils 10; because the magnets 21 on the brake disc 2 continue to rotate and cut the magnetic induction line, reverse current is generated in the coils 10 to achieve the function of electromagnetic damping; the current generated in the coils 10 charges a power supply by the motor controller 20, to achieve the purpose of braking energy recovery. During moderate-intensity braking, reverse current is applied to the coils 10 to generate a magnetic field that rotates reversely, so as to make the brake disc 2 brake; during emergency braking, brake calipers 8 are added to extrude the brake disc 2 to implement mechanical friction braking; the friction braking is combined with the electromagnetic damping braking, thereby improving the braking performance of the brake disc 2. During backing, the rotating magnetic field is controlled to rotate reversely, to implement reverse rotation of the motor.

The coil support in the present application includes a first coil support 1 and a second coil support 3 respectively disposed at two sides of the brake disc 2, and the first coil support 1 and the second coil support 3 are both sleeved on the center shaft 5; the first coil support 1 and the second coil support 3 are both provided with the coils 10. The use of the two coil supports can improve the effect of the magnetic field force, thereby improving the power support for the automobile. The number of turns of each coil 10 disclosed in the present application may be 1,000-1,500, and the wire diameter is 0.2-0.8 mm. Here, the ranges of the size and the number of turns of the coils 10 are provided only but can be selected according to different requirements in practice. In addition, only one coil support or multiple coil supports can be provided in practice, as long as the approaches of satisfying the requirements all fall within the scope of protection.

In the hub motor disclosed in the present application, the first coil support 1 and the second coil support 3 are both ring-shaped housings, and the sides of the ring-shaped housings close to the brake disc 2 are both provided with openings; the coils 10 are provided at the openings of the ring-shaped housings and opposite to the magnets 21. The present invention discloses a structure of a coil support, which is specifically a circular ring-shaped housing and has a radial section that is a U-shaped structure. That is, the housing has a bottom surface, a top surface, and a side surface connected with the top surface and the bottom surface, where both the top surface and the bottom surface are circular surfaces, and the side surface close to the brake disc 2 is an opening structure and has no surface; the coils 10 are mounted between the top surface and the bottom surface, and are arranged corresponding to the magnets 21. In addition, the coil support may also be configured as a simple support structure, as long as it can implement the mounting of the coils. The first coil support 1 and the second coil support 3 disclosed in the present application are both sleeved on the center shaft 5; in the rotation process of the center shaft 5, the first coil support 1 and the second coil support 3 do not rotate along with the center shaft.

Figure 3:
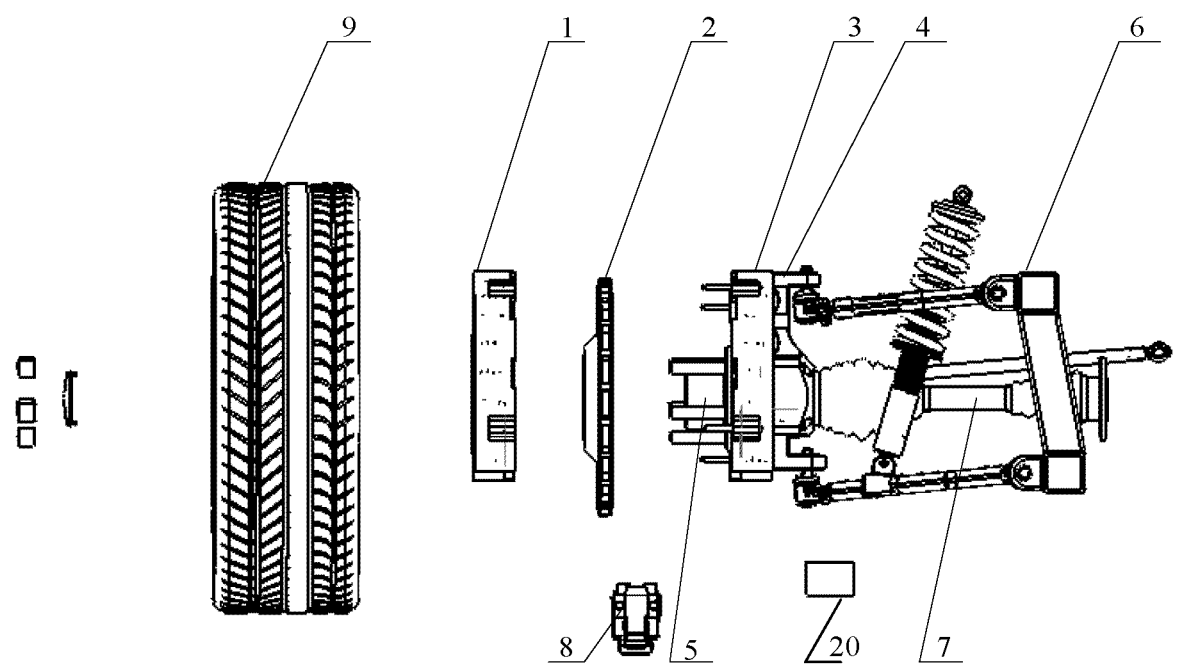
FIG. 3 is an exploded structural view of a part of an automobile provided by one embodiment of the present invention.
Figure 4:
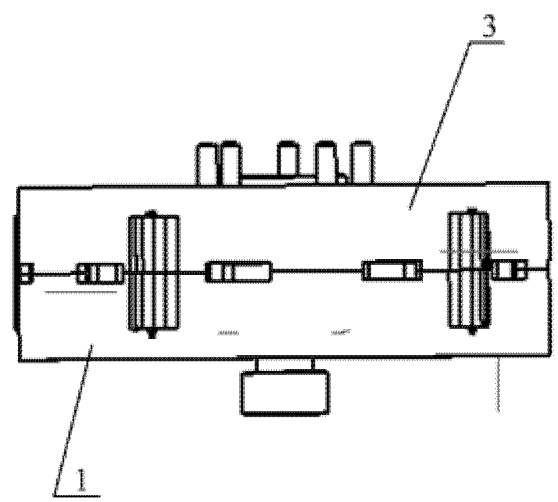
FIG. 4 is a top view of the first coil support and the second coil support of FIG. 3 after being connected.
Figure 5:
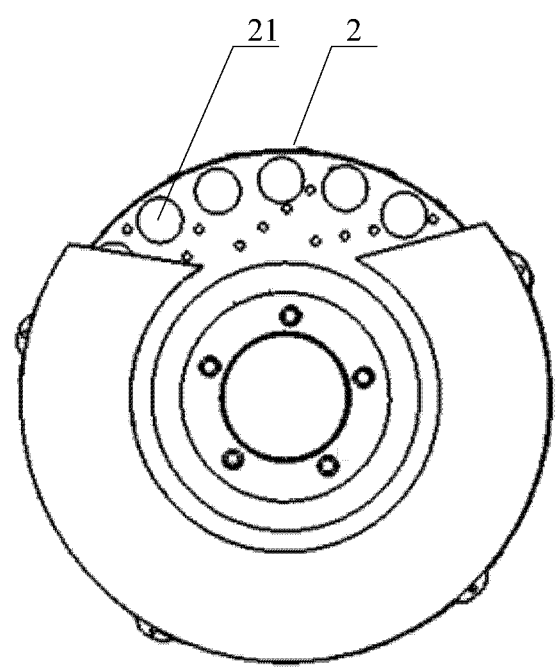
FIG. 5 is a left view of the first coil support and the second coil support of FIG. 4.
Figure 6:
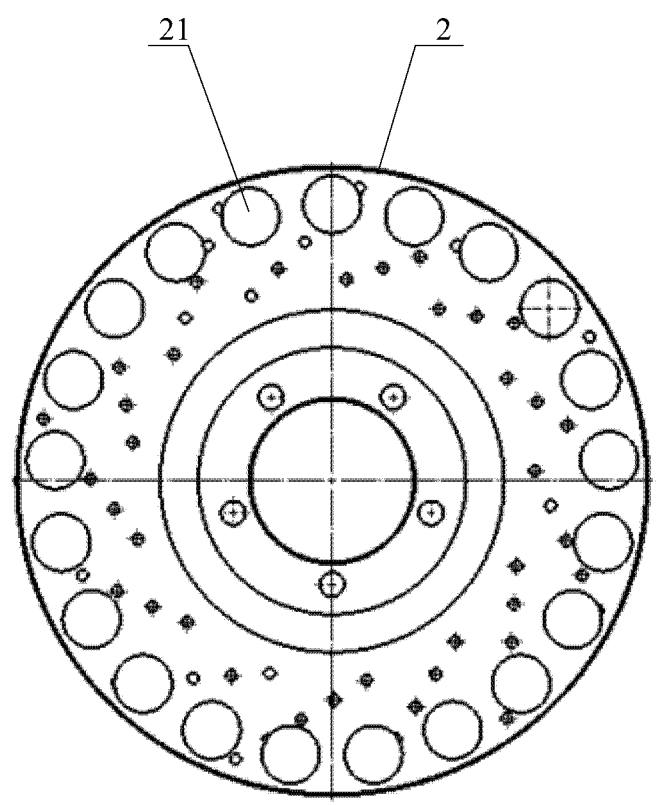
FIG. 6 is a front view of the brake disc of FIG. 3.
Figure 7:
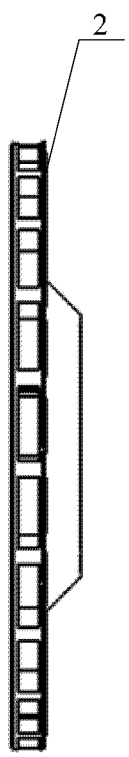
FIG. 7 is a side view of the brake disc of FIG. 6.
Figure 8:
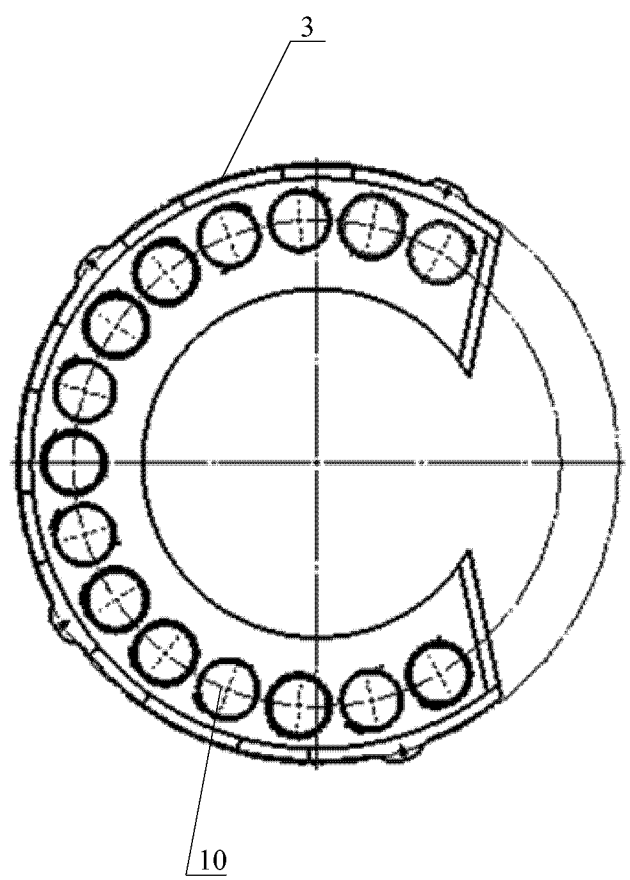
FIG. 8 is a front view of the second coil support of FIG. 4.
Figure 9:
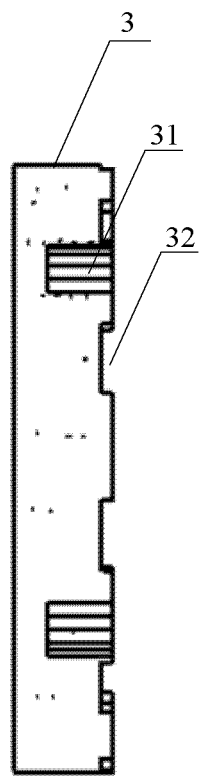
FIG. 9 is a side view of the second coil support of FIG. 8, with the screws that are shown in FIG. 3 removed from the mounting holes and in a reverse orientation from the orientation of the second coil support shown in FIG. 3.
Figure 10:
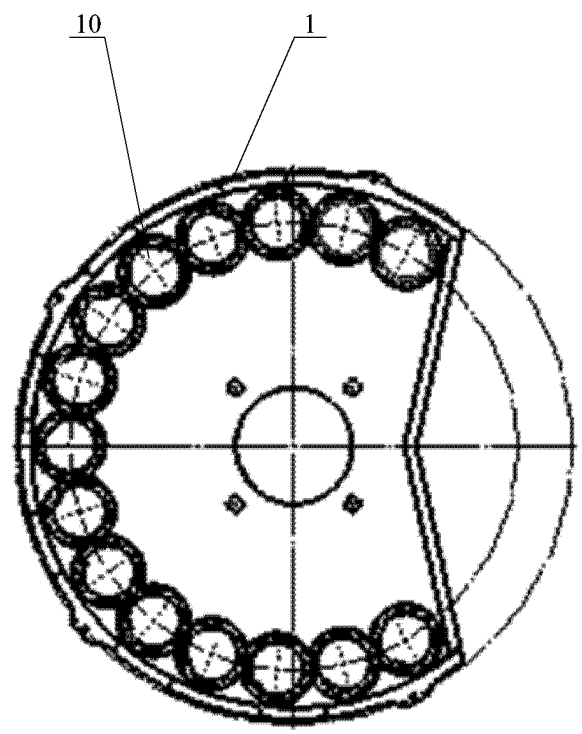
FIG. 10 is a front view of the first coil support of FIG. 4.
Figure 11:
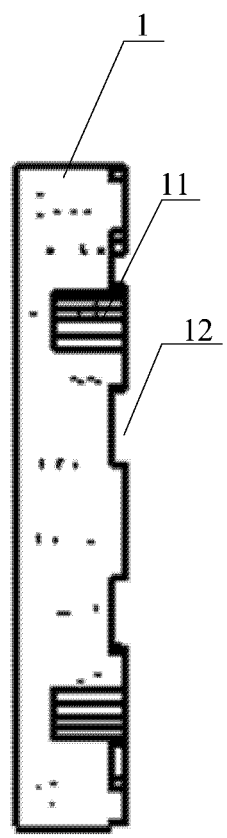
FIG. 11 is a side view of the first coil support of FIG. 10.
Figure 12:
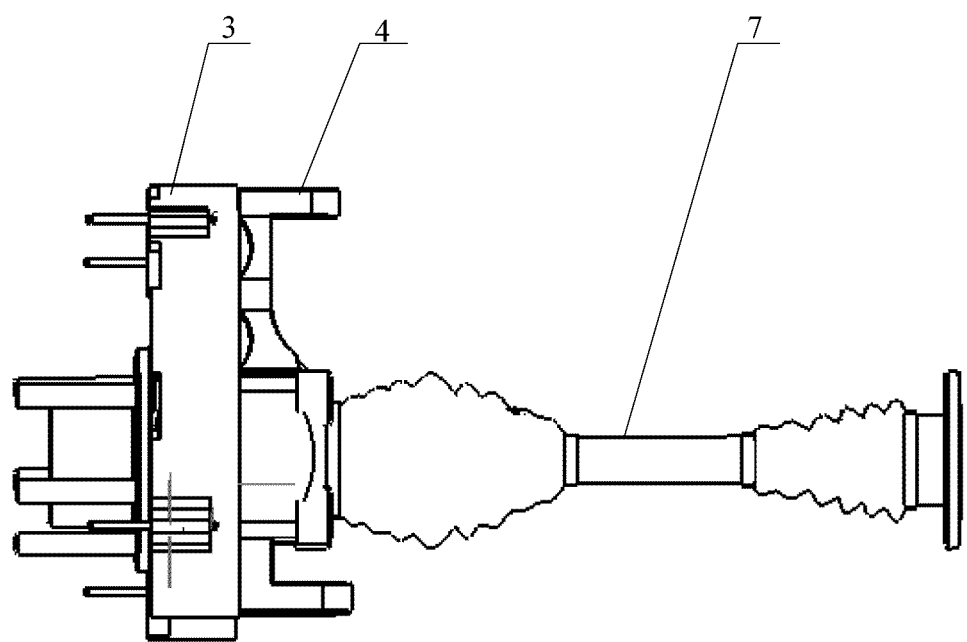
FIG. 12 is a schematic structural diagram of the second coil support and the steering knuckle of FIG. 3 that are connected.
Figure 13:
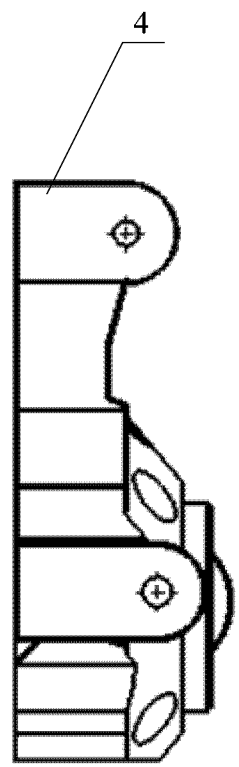
FIG. 13 is a side view of a steering knuckle provided by one embodiment of the present invention.
Figure 14:
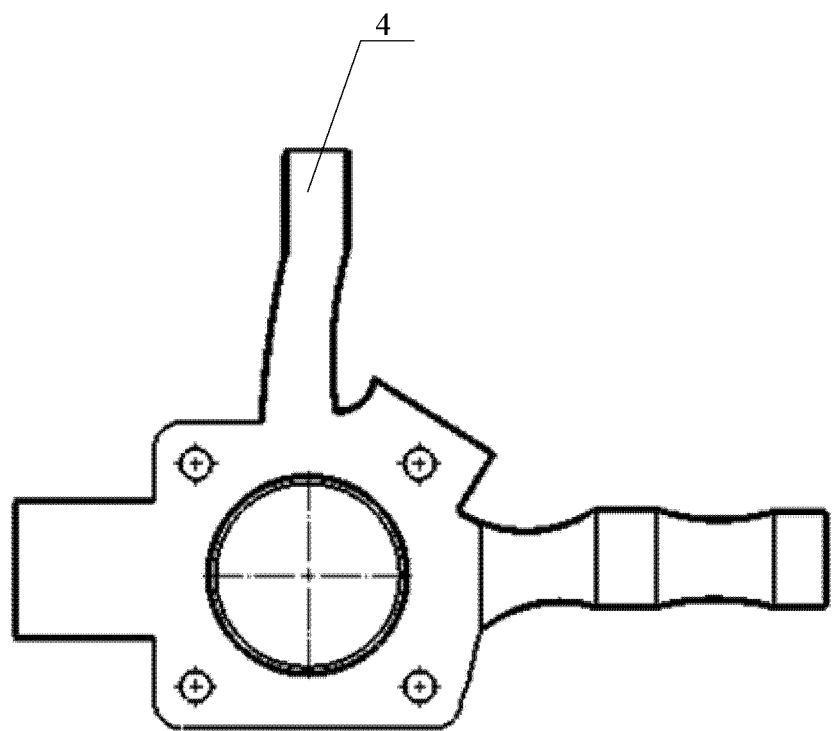
FIG. 14 is a front view of the steering knuckle of FIG. 13.

The first coil support 1 and the second coil support 3 in the present application are connected together by screws (shown extending from and engaging with the second coil support 3 in FIG. 3, for example), in order to improve the stability of the first coil support 1 and the second coil support 3. Specifically, the first coil support 1 is provided with threaded mounting holes 11, and the second coil support 3 is provided with mounting holes 31. Mounting clearances between the center shaft 5 and the first coil support 1 as well as the second coil support 3 can be set according to different requirements, and both fall within the scope of protection, as long as the stable rotation of the center shaft can be ensured. In addition, during mounting of the first coil support 1 and the second coil support 3, the brake disc 2 is located between the first coil support 1 and the second coil support 3, and the brake disc 2 is fixedly connected with the center shaft 5, i.e., it rotates along with the center shaft 5. Specifically, the center shaft 5 is connected with the brake disc 2 by a fixing bolt. Therefore, to avoid the impact caused by the coil support on the brake disc 2, it is necessary to provide outer edge clearances of 1.0-2.0 mm between the brake disc 2 and the first coil support 1 as well as the second coil support 3.

In a still further embodiment, the circumferential surface of the brake disc 2 is provided with first vents; the first coil support and the second coil support are connected and second vents are formed on the circumferential surfaces thereof; specifically, the first coil support 1 is provided with second left half vents 12, the second coil support 3 is provided with second right half vents 32, and the second left half vents 12 and the second right half vents 32 constitute the second vents. Specifically, the central angle between two adjacent second vents is an integral multiple of the central angle between two adjacent first vents. Specifically, the number of the second vents is six, the number of the threaded mounting holes 11 is four, and the second vents and the threaded mounting holes are arranged alternately. The cylindrical permanent magnets are equal to the brake disc 2 in height, and the diameter of the cylindrical permanent magnets is less than the maximum diameter of the first vents, thereby ensuring the heat dissipation uniformity and heat dissipation effect of the brake disc 2.

In a further embodiment, to improve the braking effect of the brake disc 2, the brake disc further includes brake calipers 8. The specific structure and mounting mode of the brake calipers 8 are the same as those in the prior art. However, the two sides of the brake disc 2 in the present application are both provided with coil supports, to provide mounting spaces for the brake calipers 8; the ring-shaped housings disclosed in the present application are further provided with receding grooves for mounting the brake calipers 8, so as to ensure the normal mounting and use of the brake calipers 8. In view of the description above, based on the original structure, it can form axial through holes in the brake disc 2 only, provide magnets 21 in the through holes, and add the first coil support 1 and the second coil support 3 correspondingly. Therefore, the shapes of the first coil support 1 and the second coil support 3 need to be set according to the space of the existing structure. With the above settings, the chassis and suspension structures of the original vehicle can be unchanged, and changes in the existing structures of the automobile are reduced.

In a specific embodiment, the first coil support 1 and the second coil support 3 are both 5/6 circular ring-shaped housing structures, and gaps formed by the ring-shaped housings are the receding grooves. The sizes of the first coil support 1 and the second coil support 3 can be set according to different requirements, and both fall within the scope of protection.

The through holes provided in the brake disc 2 disclosed in the present application are plural in number, (preferably 15 to 30) and are evenly arranged along the circumferential direction of the brake disc 2. The magnets 21 in the present application have one-to-one correspondence to the through holes, i.e., each through hole is provided therein with a magnet 21. In addition, because the first coil support 1 and the second coil support 3 are ring-shaped structures having gaps, but the set distances between adjacent coils 10 are also the same, that is, these coils 10 are also evenly arranged on the corresponding coil support. After the coils 10 are charged, the magnets 21 cut the magnetic induction line under the action of magnetic field force, to provide power to rotate the brake disc 2.

The through holes disclosed in the embodiment above are circular through holes; the corresponding magnets 21 are cylindrical magnets, and the magnets 21 are permanent magnets. A person skilled in the art can understand that, in practice, the shapes and sizes of the magnets 21 and the through holes, as well as the numbers thereof, can be defined according to different requirements, and excitation coils can also be added to excite a stronger magnetic field. A person skilled in the art makes no specific limitation here, but those all fall within the scope of protection.

As shown in FIGS. 3-14, the present invention in yet another embodiment discloses an automobile, including a wheel 9, a hub motor, a steering knuckle 4, a suspension 6, a transmission half-shaft 7, and a motor controller 20. The hub motor includes a center shaft 5, a brake disc 2, and a coil support, where the center shaft 5 is connected with the wheel 9; the brake disc 2 is fixed on the center shaft 5; an end face of the brake disc 2 is provided with through holes, and magnets 21 having a magnetization direction parallel to the axis of the brake disc 2 are provided in the through holes; the coil support is provided with coils 10 corresponding to the magnets 21, and the coils 10 are able to rotate the brake disc 2 after being charged; the steering knuckle 4 is connected with the coil support, and the suspension 6 is connected with the steering knuckle 4; the center shaft 5 is connected with the transmission half-shaft 7. The motor controller 20 controls the supply of alternating current to the coils 10; when the coils 10 are positively charged, the center shaft 5 rotates positively to provide forward movement power for the wheel 9; when the coils 10 are reversely charged, the center shaft 5 brakes or rotates reversely to implement braking or reverse rotation of the wheel 9; if no current passes through the coils 10 in the rotation process of the brake disc 2, a power supply is charged to implement braking energy recovery. In the present application, axially arranged magnets 21 are added to the brake disc 2, and the coils 10 are provided correspondingly, so that the automobile can powered and braked under the action of a magnetic field. The hub motor in the present application has a simple structure, can provide power and implement transmission and braking just through a charging process, solves the problem in the prior art of complicated mechanical structure of the hub motor, reduces the weight of the hub motor, and improves the handling stability of the automobile.

Specifically, the motor controller 20 controls the voltage and current in the coils 10. In a forward movement process of an electric automobile, the motor controller 20 controls the supply of three-phase or five-phase alternating current to the coils 10 to generate a rotating magnetic field; the axial magnetic field in the coils 10 interacts with the magnetic field of the magnets 21 on the brake disc 2 to generate torque, thereby providing power for driving the automobile. In a braking process of the automobile, no current passes through the coils 10; because the magnets 21 on the brake disc 2 continue to rotate and cut the magnetic induction line, reverse current is generated in the coils 10 to achieve the function of electromagnetic damping; the current generated in the coils 10 charges a power supply by the motor controller 20, to achieve the purpose of braking energy recovery. During moderate-intensity braking, reverse current is applied to the coils 10 to generate a magnetic field that rotates reversely, so as to make the brake disc 2 brake; during emergency braking, brake calipers 8 are added to extrude the brake disc 2 to implement mechanical friction braking; the friction braking is combined with the electromagnetic damping braking, thereby improving the braking performance of the brake disc 2. During backing, the rotating magnetic field is controlled to rotate reversely, so as to implement reverse rotation of the motor.

The coil support in the present application includes a first coil support 1 and a second coil support 3 respectively disposed at two sides of the brake disc 2, and the first coil support 1 and the second coil support 3 are both sleeved on the center shaft 5; the first coil support 1 is close to the wheel 9, and the second coil support 3 is connected with the steering knuckle 4; the first coil support 1 and the second coil support 3 are both provided with the coils 10. The use of the two coil supports can improve the effect of the magnetic field force, thereby improving the power support for the automobile. The number of turns of each coil 10 disclosed in the present application may be 1,000-1,500, and the wire diameter is 0.2-0.8 mm. Here, the ranges of the size and the number of turns of the coils 10 are provided only but can be selected according to different requirements in practice. In addition, only one coil support or multiple coil supports can be provided in practice, as long as the approaches of satisfying the requirements all fall within the scope of protection.

In the automobile disclosed in the present application, the first coil support 1 and the second coil support 3 are both ring-shaped housings, and the sides of the ring-shaped housings close to the brake disc 2 are both provided with openings; the coils 10 are provided at the openings of the ring-shaped housings and opposite to the magnets 21. The present invention discloses a structure of a coil support, which is specifically a circular ring-shaped housing and has a radial section that is a U-shaped structure. That is, the housing has a bottom surface, a top surface, and a side surface connected with the top surface and the bottom surface, where both the top surface and the bottom surface are circular surfaces, and the side surface close to the brake disc 2 is an opening structure and has no surface; the coils 10 are mounted between the top surface and the bottom surface, and are arranged corresponding to the magnets 21. In addition, the coil support may also be configured as a simple support structure, as long as it can implement the mounting of the coils. The first coil support 1 and the second coil support 3 disclosed in the present application are both sleeved on the center shaft 5; in the rotation process of the center shaft 5, the first coil support 1 and the second coil support 3 do not rotate along with the center shaft, where the second coil support 3 is connected with the steering knuckle 4, specifically, the connection can be implemented by a fixing bolt.

The first coil support 1 and the second coil support 3 in the present application are connected together by screws, in order to improve the stability of the first coil support 1 and the second coil support 3. Specifically, the first coil support 1 is provided with threaded mounting holes 11, and the second coil support 3 is provided with mounting holes 31. The second coil support 3 is fixedly connected with the steering knuckle 4, so that the first coil support 1 and the second coil support 3 are both stationary, while the center shaft 5 is rotatable. Mounting clearances between the center shaft 5 and the first coil support 1 as well as the second coil support 3 can be set according to different requirements, and both fall within the scope of protection, as long as the stable rotation of the center shaft can be ensured. In addition, during mounting of the first coil support 1 and the second coil support 3, the brake disc 2 is located between the first coil support 1 and the second coil support 3, and the brake disc 2 is fixedly connected with the center shaft 5, i.e., it rotates along with the center shaft 5. Specifically, the center shaft 5 is connected with the brake disc 2 by a fixing bolt. Therefore, to avoid the impact caused by the coil support on the brake disc 2, it is necessary to provide clearances of 1.0-2.0 mm between the brake disc 2 and the first coil support 1 as well as the second coil support 3.

In a further embodiment, to improve the braking effect of the brake disc 2, the brake disc further includes brake calipers 8. The specific structure and mounting mode of the brake calipers 8 are the same as those in the prior art. However, the two sides of the brake disc 2 in the present application are both provided with coil supports, in order to provide mounting spaces for the brake calipers 8; the ring-shaped housings disclosed in the present application are further provided with receding grooves for mounting the brake calipers 8, so as to ensure the normal mounting and use of the brake calipers 8. In view of the description above, based on the original structure, it can form axial through holes in the brake disc 2 only, provide magnets 21 in the through holes, and add the first coil support 1 and the second coil support 3 correspondingly. Therefore, the shapes of the first coil support 1 and the second coil support 3 need to be set according to the space of the existing structure. With the above settings, changes in the existing structures of the automobile are reduced.

In a specific embodiment, the first coil support 1 and the second coil support 3 are both 5/6 circular ring-shaped housing structures, and gaps formed by the ring-shaped housings are the receding grooves. The sizes of the first coil support 1 and the second coil support 3 can be set according to different requirements, and both fall within the scope of protection.

The through holes provided in the brake disc 2 disclosed in the present application are plural in number, (for example, 15 or 21) and are evenly arranged along the circumferential direction of the brake disc 2. The magnets 21 in the present application have one-to-one correspondence to the through holes, i.e., each through hole is provided therein with a magnet 21. In addition, because the first coil support 1 and the second coil support 3 are ring-shaped structures having gaps, but the set distances between adjacent coils 10 are also the same, that is, these coils 10 are also evenly arranged on the corresponding coil support. After the coils 10 are charged, the magnets 21 cut the magnetic induction line under the action of magnetic field force, to provide power to rotate the brake disc 2.

The through holes disclosed in the embodiment above are circular through holes; the corresponding magnets 21 are cylindrical magnets, and the magnets 21 are permanent magnets. A person skilled in the art can understand that, in practice, the shapes and sizes of the magnets 21 and the through holes, as well as the numbers thereof, can be defined according to different requirements, and excitation coils can also be added to excite a stronger magnetic field. A person skilled in the art makes no specific limitation here, but those all fall within the scope of protection.

In a still further embodiment, the circumferential surface of the brake disc 2 is provided with first vents; the first coil support and the second coil support are connected and second vents are formed on the circumferential surfaces thereof; specifically, the first coil support 1 is provided with second left half vents 12, the second coil support 3 is provided with second right half vents 32, and the second left half vents 12 and the second right half vents 32 constitute the second vents. Specifically, the central angle between two adjacent second vents is an integral multiple of the central angle between two adjacent first vents. Specifically, the number of the second vents is six, the number of the threaded mounting holes 11 is four, and the second vents and the threaded mounting holes are arranged alternately. The cylindrical permanent magnets are equal to the brake disc 2 in height, and the diameter of the cylindrical permanent magnets is less than the maximum diameter of the first vents, thereby ensuring the heat dissipation uniformity and heat dissipation effect of the brake disc 2.

The above automobile can modify or add components of the prototype vehicle, to implement pure electric drive or to combine electric drive and engine drive to form a hybrid electric vehicle. The hub motor can implement electromagnetic damping braking and braking energy recovery of a vehicle and can implement united braking of the electromagnetic damping braking and mechanical friction braking.

The above automobile can modify or add two of the hub motors to implement front two-wheel drive or rear two-wheel drive and can modify or add four of the hub motors to implement full-time four-wheel drive of the vehicle, which can also be switched to the front two-wheel drive or rear two-wheel drive.

Each embodiment of the present specification is described in a progressive manner, each embodiment focuses on the difference from other embodiments, and the same and similar parts between the embodiments may refer to each other.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:
1. A hub motor, comprising:
a center shaft;
a brake disc fixedly connected with the center shaft, an end face of the brake disc being provided with through holes, and magnets having a magnetization direction parallel to an axis of the brake disc being provided in the through holes;
a coil support sleeved on the center shaft and capable of rotating with respect to the center shaft, the coil support being provided with coils opposite to the magnets, the coils being able to rotate the brake disc after being charged, and the magnets are cylindrical permanent magnets matching the through holes;
a motor controller controls a supply of three-phase or five-phase alternating current to the coils to generate a rotating magnetic field; an axial magnetic field in the coils interacts with a magnetic field of the magnets on the brake disc to generate torque, thereby providing power for driving an automobile; in a braking process of the automobile, no current passes through the coils; because the magnets on the brake disc continue to rotate and cut the magnetic induction line, reverse current is generated in the coils to achieve the function of electromagnetic damping; the current generated in the coils charges a power supply by the motor controller, to achieve the purpose of braking energy recovery; during moderate-intensity braking, reverse current is applied to the coils to generate a magnetic field that rotates reversely, so as to make the brake disc brake; during emergency braking, brake calipers are added to extrude the brake disc to implement mechanical friction braking; the friction braking is combined with the electromagnetic damping braking, thereby improving a braking performance of the brake disc; during backing, the rotating magnetic field is controlled to rotate reversely, so as to implement reverse rotation of the motor;

the coil support comprises a first coil support and a second coil support respectively disposed at two sides of the brake disc; the first coil support and the second coil support are both sleeved on the center shaft; the first coil support and the second coil support are both provided with the coils; and a circumferential surface of the brake disc is provided with first vents, the first coil support and the second coil support are connected and second vents are formed on circumferential surfaces thereof, and a central angle between two adjacent second vents is an integral multiple of a central angle between two adjacent first vents; and a diameter of the cylindrical permanent magnets is less than a maximum diameter of the first vents.

2. The hub motor according to claim 1, wherein the first coil support and the second coil support are both ring-shaped housings; the sides of the ring-shaped housings close to the brake disc are both provided with openings; the coils are provided at the openings of the ring-shaped housings and opposite to the magnets.

3. The hub motor according to claim 2, wherein the first coil support and the second coil support are fixedly connected by screws.

4. The hub motor according to claim 3, wherein the through holes are plural in number, and the magnets have one-to-one correspondence to the through holes.

5. The hub motor according to claim 4, wherein all the through holes are evenly arranged along the circumferential direction of the brake disc.

6. The hub motor according to claim 4, wherein the through holes are circular through holes.

7. The hub motor according to claim 2, wherein the ring-shaped housings are both provided with receding grooves for mounting brake calipers.

8. The hub motor according to claim 7, wherein the ring-shaped housings are both provided with 5/6 circular rings, and gaps formed by the ring-shaped housings are the receding grooves.

9. The hub motor according to claim 8, wherein the through holes are plural in number, and the magnets have one-to-one correspondence to the through holes.

10. The hub motor according to claim 9, wherein all the through holes are evenly arranged along the circumferential direction of the brake disc.

11. The hub motor according to claim 9, wherein the through holes are circular through holes.

12. The hub motor according to claim 7, wherein the through holes are plural in number, and the magnets have one-to-one correspondence to the through holes.

13. The hub motor according to claim 12, wherein all the through holes are evenly arranged along the circumferential direction of the brake disc.

14. The hub motor according to claim 12, wherein the through holes are circular through holes.

15. The hub motor according to claim 2, wherein the through holes are plural in number, and the magnets have one-to-one correspondence to the through holes.

16. The hub motor according to claim 15, wherein all the through holes are evenly arranged along the circumferential direction of the brake disc.

17. The hub motor according to claim 15, wherein the through holes are circular through holes.

18. The hub motor according to claim 1, wherein the through holes are plural in number, and the magnets have one-to-one correspondence to the through holes.

19. The hub motor according to claim 18, wherein all the through holes are evenly arranged along the circumferential direction of the brake disc.

20. The hub motor according to claim 18, wherein the through holes are circular through holes.

* * * * *